United States Patent
Yamamoto

(10) Patent No.: US 7,062,908 B2
(45) Date of Patent: Jun. 20, 2006

(54) CONSTRUCTION FOR EXHAUST EMISSION CONTROL

(75) Inventor: Kosei Yamamoto, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 154 days.

(21) Appl. No.: 10/689,325

(22) Filed: Oct. 20, 2003

(65) Prior Publication Data

US 2004/0079074 A1    Apr. 29, 2004

(30) Foreign Application Priority Data

Oct. 21, 2002    (JP) ............................ 2002-305270

(51) Int. Cl.
*F01N 3/10* (2006.01)
(52) U.S. Cl. ............................ 60/299; 60/296; 60/297; 60/300; 60/311; 55/DIG. 30; 181/220; 181/231; 181/258
(58) Field of Classification Search .................. 60/287, 60/296, 297, 299, 300, 311, 284; 55/DIG. 30; 181/220, 231, 258, 259
See application file for complete search history.

(56) References Cited

U.S. PATENT DOCUMENTS

| | | | | |
|---|---|---|---|---|
| 3,420,052 A | * | 1/1969 | Miller | .......................... 60/320 |
| 3,837,165 A | * | 9/1974 | Arrigoni et al. | ................ 60/277 |
| 4,916,897 A | * | 4/1990 | Hayashi et al. | ................ 60/286 |
| 5,052,178 A | * | 10/1991 | Clerc et al. | ..................... 60/274 |
| 5,388,407 A | * | 2/1995 | Capers et al. | .................. 60/302 |
| 5,653,105 A | * | 8/1997 | Noirot et al. | ................... 60/297 |
| 5,937,641 A | * | 8/1999 | Graham et al. | ................ 60/302 |
| 5,972,299 A | * | 10/1999 | Huang et al. | ................ 422/173 |
| 6,588,203 B1 | * | 7/2003 | Hirota et al. | .................. 60/297 |
| 6,622,482 B1 | * | 9/2003 | Knight et al. | .................. 60/299 |

FOREIGN PATENT DOCUMENTS

| | | |
|---|---|---|
| DE | 19626980 A1 | 2/1998 |
| EP | 166480 A1 * | 1/1986 |
| EP | 0898643 B1 | 5/1999 |
| EP | 1108864 A1 | 7/2000 |
| JP | 52-70224 * | 11/1977 |

OTHER PUBLICATIONS

Japanese Utility Model Provisional Publication No. 57-114123.
Japanese Patent Provisional Publication No. 5-237397.

* cited by examiner

*Primary Examiner*—TU M. Nguyen
(74) *Attorney, Agent, or Firm*—Trop, Pruner & Hu, P.C.

(57) ABSTRACT

An object of the present invention is to provide a construction for exhaust emission control, which can prevent thermal deterioration in a catalyst and can heat exhaust gas to a catalyst activation temperature. In the present invention, an electrically heated catalyst portion 10 is provided in a separator 12a in a silencer 3 located at a distance from an engine. This electrically heated catalyst portion 10 heats low-temperature exhaust gas to a catalyst activation temperature. The exhaust pipe 11a branches into three pipes 22a, 22b and 22c in the silencer 3. The electrically heated catalyst portion 10 has a shape surrounding the each outer peripheral surface of pipe 22a, 22b and 22c of an exhaust pipe 11a. Exhaust gas is warmed to a temperature close to the catalyst activation temperature when it flows in the pipes 22a, 22b and 22c, and flows out of the pipe 22a, 22b and 22c. Subsequently, the exhaust gas is heated to the catalyst activation temperature when it passes through the electrically heated catalyst portion 10.

2 Claims, 3 Drawing Sheets

CONSTRUCTION FOR EXHAUST EMISSION CONTROL

FIELD OF THE INVENTION AND RELATED ART STATEMENT

The present invention relates to a construction for exhaust emission control, which controls exhaust emission from an internal combustion engine by using a catalyst. More particularly, it relates to a compact construction for exhaust emission control, which provides excellent exhaust emission control performance without causing catalyst deterioration and power down.

Generally, in order to activate a catalyst for exhaust emission control for an internal combustion engine, it is important to keep the catalyst at a fixed high temperature. For this purpose, the catalyst is arranged near the engine so as to be warmed by the exhaust gas. However, the catalyst disposed near the engine is always exposed to exhaust gas of a very high temperature. Moreover, the catalyst is further heated by reaction heat. Therefore, thermal deterioration of the catalyst occurs at an early stage, and hence the exhaust emission control performance is decreased significantly.

Technologies for restraining such thermal deterioration have been disclosed, for example, in Japanese Utility Model Provisional Publication No. 57-114123 and Japanese Patent Provisional Publication No. 5-237397. In both technologies disclosed in these Publications, the catalyst is disposed in a silencer.

However, according to the above-described technologies, since the temperature of exhaust gas is low in the silencer, the catalyst cannot be activated by the exhaust gas alone in some cases. To overcome this problem, a technology is available in which an electrically heated catalyst (EHC) is mounted between an exhaust manifold and a main catalyst lying on the downstream side thereof separately from the main catalyst, and at the cooling time and start time, at which the main catalyst cannot achieve its performance sufficiently, a current is carried to heat the EHC, by which an activation temperature is obtained early. However, according to this construction, since the EHC is disposed just under the exhaust manifold, the exhaust emission control performance of EHC is decreased by thermal deterioration.

OBJECT AND SUMMARY OF THE INVENTION

The present invention has been made in view of the above situation, and accordingly an object thereof is to provide a construction for exhaust emission control, which can prevent thermal deterioration in a catalyst and can heat exhaust gas to a catalyst activation temperature.

The present invention provides a construction for exhaust emission control having an electrically heated catalyst portion, wherein the electrically heated catalyst portion is disposed in a silencer. A main catalyst portion separate from the electrically heated catalyst portion is disposed near an engine. The electrically heated catalyst portion is provided so as to penetrate a separator which forms expansion chambers by dividing the interior of the silencer.

The electrically heated catalyst portion is formed so as to surround the outer peripheral surface of an exhaust gas flow path pipe in the silencer.

Thereby, exhaust gas flowing out of the exhaust gas flow path pipe flows back and passes through the electrically heated catalyst portion. The construction may also be such that the exhaust gas flow path pipe branches halfway and the branch pipes pass through the electrically heated catalyst portion.

The present invention provides a construction for exhaust emission control having an electrically heated catalyst portion, wherein the electrically heated catalyst portion is disposed in a silencer. Therefore, thermal deterioration in the electrically heated catalyst caused by high-temperature exhaust gas near the engine can be prevented. Also, by using an electrically heated catalyst, exhaust gas can be heated to a temperature suitable for controlling exhaust emission.

If the main catalyst portion separate from the electrically heated catalyst portion is disposed near the engine, exhaust emission control is carried out by the main catalyst portion when the temperature of exhaust gas is high and by the electrically heated catalyst portion at the engine start time when the temperature of exhaust gas is low, so that excellent exhaust emission control performance can be provided.

If the electrically heated catalyst portion is provided so as to penetrate the separator which forms expansion chambers by dividing the interior of the silencer, the electrically heated catalyst can be disposed in the discharge path of exhaust gas, so that exhaust emission control can be carried out reliably.

If the electrically heated catalyst portion is formed so as to surround the outer peripheral surface of the exhaust gas flow path pipe in the silencer, exhaust gas in the flow path pipe can be heated efficiently by the electrically heated catalyst.

If the construction is such that exhaust gas flowing out of the exhaust gas flow path pipe surrounded by the electrically heated catalyst portion flows back and passes through the electrically heated catalyst portion, a catalyst with a sufficient volume though having a compact shape can be mounted.

If the construction is such that the exhaust gas flow path pipe branches halfway and the branch pipes pass through the electrically heated catalyst portion, exhaust gas can be heated efficiently.

DETAILED DESCRIPTION OF PREFERRED EMBODIMENTS

An embodiment of a construction for exhaust emission control in accordance with the present invention will now be described with reference to the accompanying drawings.

Figure 1:
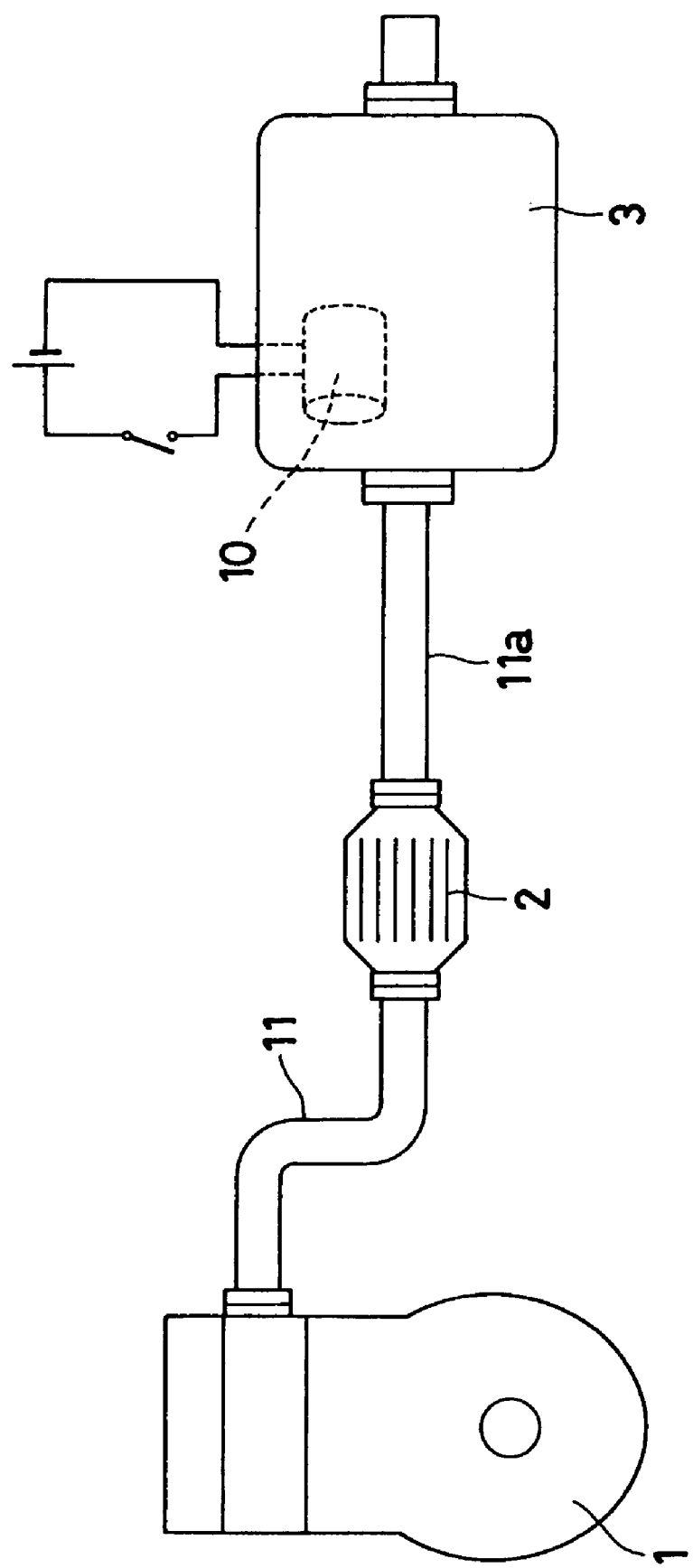
FIG. 1 is a schematic front view of an exhaust system to which a construction for exhaust emission control in accordance with one embodiment of the present invention is applied.
Figure 3:
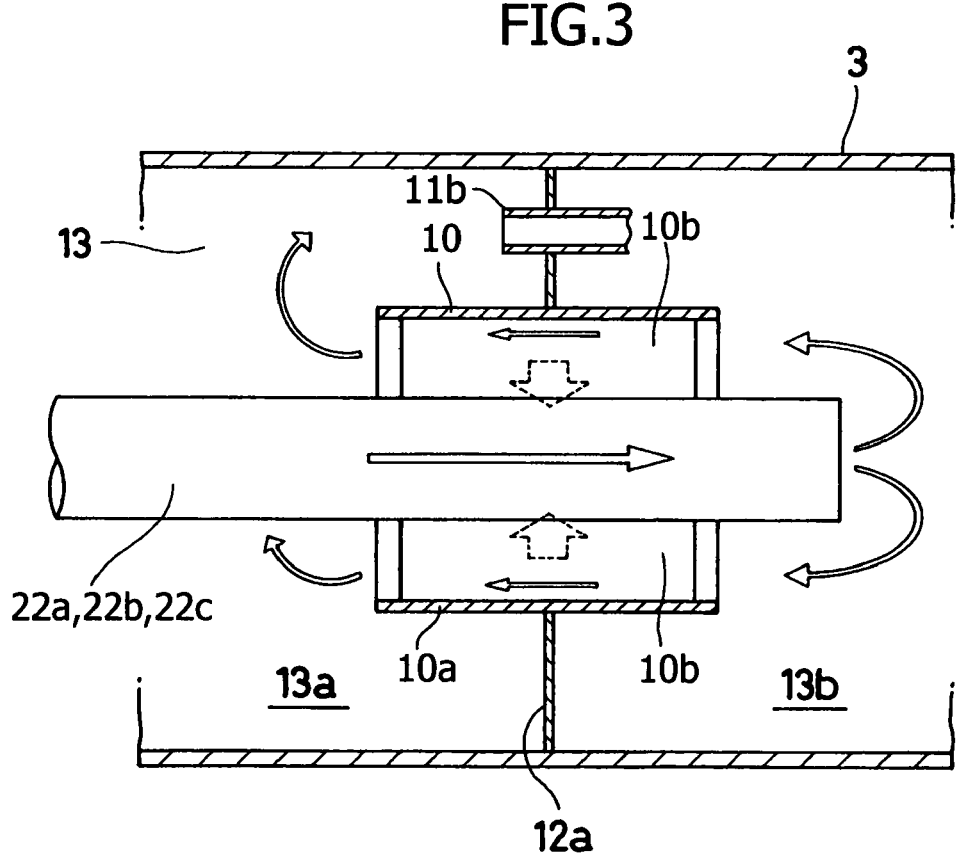
FIG. 3 is a partially sectional view of the silencer shown in FIG. 2.

FIG. 1 is a schematic view of an exhaust system to which a construction for exhaust emission control in accordance with one embodiment of the present invention is applied. As shown in FIG. 1, an exhaust pipe 11 is connected to an engine 1, and a main catalyst 2 and a silencer 3 are provided at intermediate positions of the exhaust pipe 11. The main catalyst 2 is located on the upstream side of the silencer 3 so as to be close to the engine 1. The silencer 3 contains an electrically heated catalyst portion 10 that serves as an auxiliary catalyst on the downstream side of exhaust passage. The catalyst portion 10 (hereinafter referred simply to as a catalyst 10) is a self-heating catalyst due to electrical heating, and contains a catalyst 10b disposed in an outer shell 10a as shown in FIG. 3. The circuit for heating means is as shown in FIG. 1.

In this embodiment, since the main catalyst 2 is located close to the engine 1, the temperature of exhaust gas passing through the main catalyst 2 after warming up of engine is higher than a temperature necessary for chemical reaction (catalyst activation temperature). On the other hand, the silencer 3 is located at a position distant from the engine 1, so that the temperature of exhaust gas is lower than the catalyst activation temperature. Therefore, the catalyst 10 in the silencer 3 is not exposed directly to high-temperature exhaust gas, so that a remarkable decrease in exhaust emission control performance caused by thermal deterioration can be prevented.

Also, since the catalyst 10 generates heat by itself due to electrical heating, low-temperature exhaust gas in the catalyst can be warmed to the catalyst activation temperature, and hence excellent exhaust emission control performance can be obtained. Furthermore, when the temperature of the catalyst itself is raised by exhaust gas at the time of full throttle operation, by controlling the supply of power to the catalyst 10, sintering (a phenomenon in which powder particles or metal fine particles are bonded and solidified when powder or metal fine particles are heated) of catalyst metal due to heat and the like phenomena are prevented, so that excellent exhaust emission control performance can be maintained.

Figure 2:
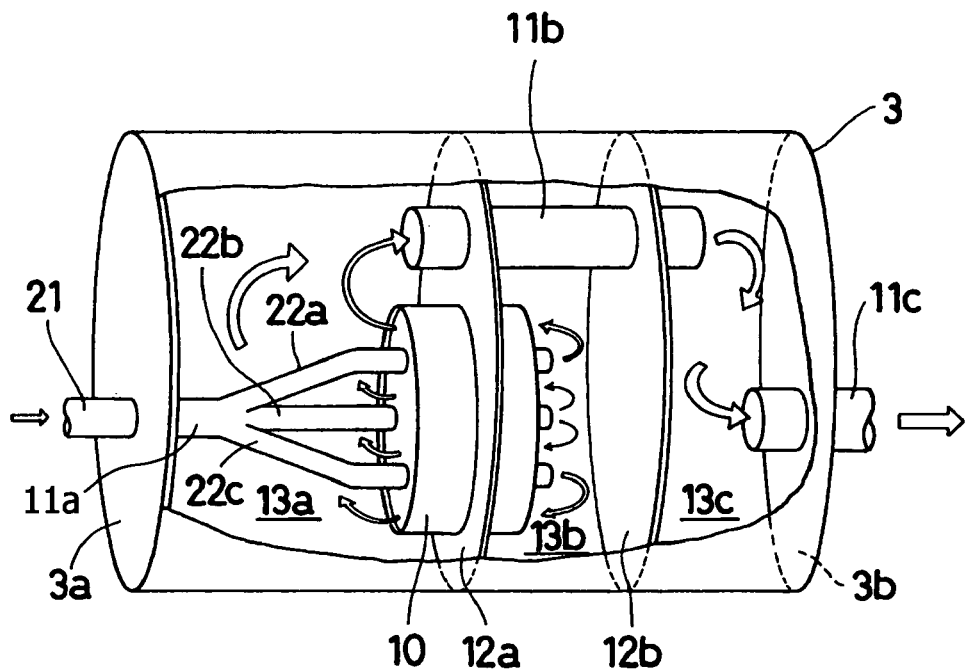
FIG. 2 is a partially broken perspective view showing an internal construction of a silencer of a second modification.

FIG. 2 is a partially broken perspective view showing an internal construction of the silencer 3. As shown in FIG. 2, the silencer 3 has a cylindrical shape, and is provided with lids 3a and 3b at both ends thereof. The interior of the silencer 3 is divided into three expansion chambers 13a, 13b and 13c by two separators 12a and 12b. The exhaust pipe 21 is divided into three: an exhaust pipe 11a in an introduction portion, an exhaust pipe 11b in an intermediate portion, and an exhaust pipe 11c in a delivery portion, in the silencer 3. The exhaust pipe 21 branches into three pipes 22a, 22b and 22c. The catalyst 10 has a construction provided so as to be in contact with the each outer peripheral portion of three pipes 22a, 22b and 22c of the exhaust pipe 11a that is introduced from the main catalyst 2 into the silencer 3, and is provided so as to penetrate the separator 12a in such a manner as to be located in both of the expansion chambers 13a and 13b.

The each downstream end of pipes 22a, 22b and 22c of the exhaust pipe 11a is located in the expansion chamber 13b. Also, the upstream end of the exhaust pipe 11b is located in the expansion chamber 13a and the downstream end thereof is located in the expansion chamber 13c. The upstream end of the exhaust pipe 11c is located in the expansion chamber 13c. Specifically, after exhaust gas first flows into the expansion chamber 13b, it flows back to the expansion chamber 13a located on the upstream side of the expansion chamber 13b, and finally moves to the expansion chamber 13c.

Next, heating of exhaust gas in the silencer will be described. As shown in FIG. 3, exhaust gas is heated from the surroundings by the heat of the catalyst 10 when passing through pipes 22a, 22b and 22c of the exhaust pipe 11a (first-stage heating), by which it is warmed to a temperature close to the catalyst activation temperature. Further, the exhaust gas is heated to the catalyst activation temperature by the catalyst 10 when it passes through the catalyst 10 and moves into the expansion chamber 13a (second-stage heating). Each of the outer peripheries of these three pipes 22a, 22b and 22c is in contact with the electrically heated catalyst portion 10. Therefore, the exhaust gas heating efficiency is improved, and further excellent exhaust emission control performance can be obtained. The number of branches is not limited to three, and may be three or more.

Figure 4:
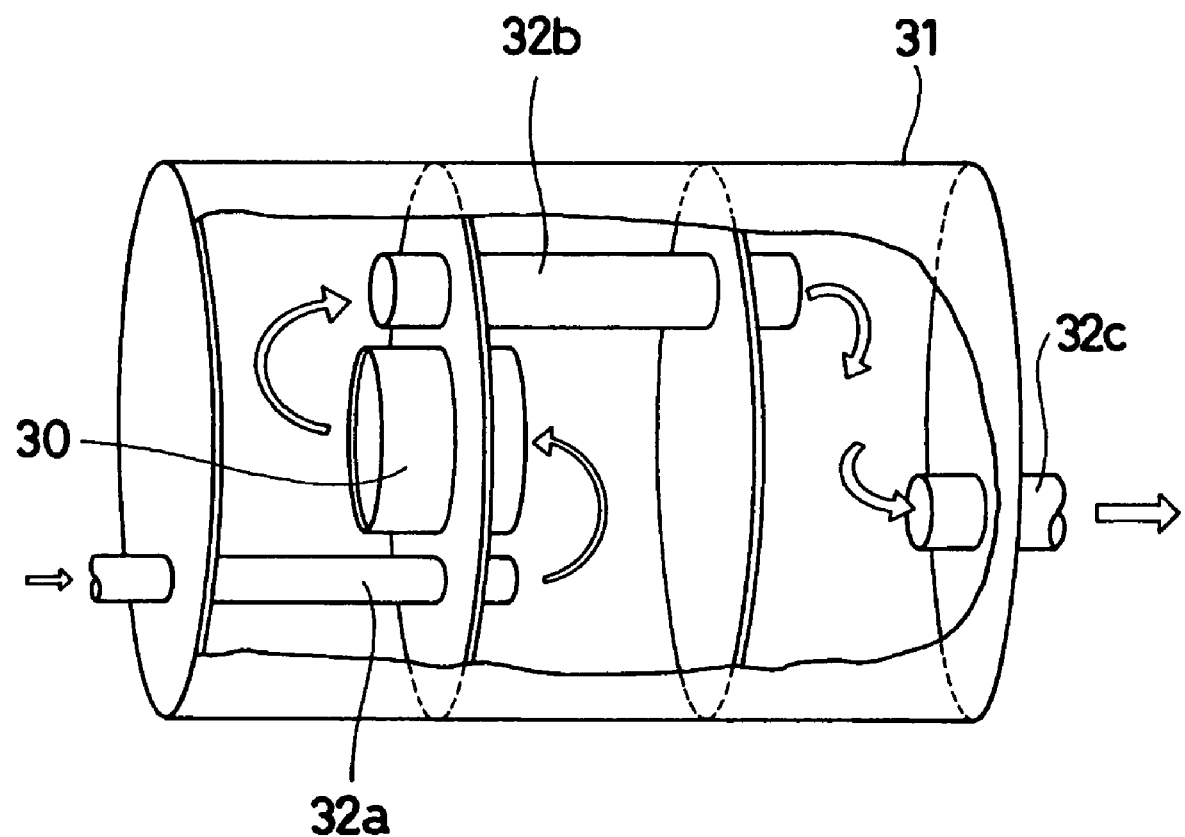
FIG. 4 is a partially broken perspective view showing an internal construction of a silencer for the exhaust system shown in FIG. 1.

As shown in FIG. 4, an exhaust pipe 32a and an electrically heated catalyst 30 can also be arranged in parallel. If an outer peripheral U-turn construction in which exhaust gas flows back and passes the catalyst 10 is used, a catalyst having a sufficient volume can be mounted while a very compact outside diameter shape of silencer is realized.

Also, as shown in FIG. 4, configuration can be such that exhaust gas is heated to the catalyst activation temperature merely by the passage through the electrically heated catalyst 30. As shown in FIG. 2, in the electrically heated catalyst portion 10, the temperature of exhaust gas is raised by two-stage heating to obtain very excellent exhaust emission control performance, so that sufficient heating performance can be obtained with a compact volume. Furthermore, the necessary amount of electrical energy can be restrained. Along with the decreased volume of electrically heated catalyst, a smaller amount of carried catalyst noble metal is needed, so that the catalyst cost can be reduced significantly.

This embodiment proposes an exhaust emission control system that has excellent exhaust emission control performance by using the main catalyst disposed close to the engine and the doughnut-shaped electrically heated catalyst arranged in the silencer as exhaust emission control catalysts, can restrain thermal deterioration in catalyst, and can be made compact in size.

Although the catalyst 10 is arranged in the separator 12a in this embodiment, it may be arranged in the other separator 12b. The number of catalysts 10 is not subject to any restriction, and a plurality of catalysts 10 may be provided according to the number of expansion chambers. Although three expansion chambers 13a, 13b and 13c are provided in the silencer in this embodiment, the number of expansion chambers may be two or more.

The invention claimed is:

1. A construction for exhaust emission control having an electrically heated catalyst portion in a silencer and provided downstream of a main catalyst portion which is disposed near an internal combustion engine in an exhaust gas flow path pipe of an internal combustion engine, wherein:

said electrically heated catalyst portion is provided so as to penetrate a separator which forms at least two of a first and second expansion chambers by dividing the interior of said silencer;

said electrically heated catalyst portion is formed so as to surround the outer peripheral surface of said exhaust gas flow path pipe which passes through said electrically heated catalyst portion in order to warm the exhaust gas in said exhaust gas flow path pipe, said electrically heated catalyst portion being formed in which the downstream end of said exhaust gas flow path pipe which penetrates said electrically heated catalyst portion opens into said second expansion chamber so that said warmed exhaust gas is introduced into said second expansion chamber and that said warmed exhaust gas flows back through said electrically heated catalyst portion disposed at the outer peripheral surface of said exhaust gas flow path pipe in order to introduce said exhaust gas into said first expansion chamber, said electrically heated catalyst portion being formed in which said exhaust gas introduced into said first expansion chamber is flowed to the outside;

said exhaust gas is warmed to the catalyst activation temperature so that said exhaust gas is controlled by the catalyst in said electrically heated catalyst portion.

2. The construction for exhaust emission control according to claim 1, wherein said exhaust gas flow path pipe introduced into said electrically heated catalyst portion branches into a plurality of exhaust gas flow path pipes, the plurality of exhaust gas flow path pipe penetrating said electrically heated catalyst portion.

* * * * *